United States Patent
Emmons, Jr. et al.

(10) Patent No.: US 6,411,609 B1
(45) Date of Patent: Jun. 25, 2002

(54) SYSTEM AND METHOD FOR PROVIDING DUAL SATELLITE COMMUNICATIONS COVERAGE

(75) Inventors: Thomas Peter Emmons, Jr., Mesa, AZ (US); Robert Anthony Peters, Silver Spring, MD (US); Shawn Hogberg, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/436,572

(22) Filed: Nov. 9, 1999

(51) Int. Cl.⁷ ............................................. H04B 7/212
(52) U.S. Cl. .................. 370/321; 370/280; 370/294; 370/316; 370/331; 455/12.1; 455/13.1
(58) Field of Search ................................ 370/276, 280, 370/294, 310, 315, 316, 321, 331; 455/427, 428, 436, 12.1, 13.1, 13.2; 342/352, 356, 357.01

(56) References Cited

U.S. PATENT DOCUMENTS 5,613,194 A * 3/1997 Olds et al. ................. 455/12.1
5,668,556 A * 9/1997 Rouffet et al. ............... 342/354
5,918,176 A * 6/1999 Arrington, Jr. et al. ...... 455/430
6,275,475 B1 * 8/2001 Emmons, Jr. ................ 370/276

* cited by examiner

Primary Examiner—Edward F. Urban
Assistant Examiner—Irmica M. Davis
(74) Attorney, Agent, or Firm—Ingrassia Fisher & Lorenz; Frank J. Bogacz

(57) ABSTRACT

A satellite communication system uses dual satellite coverage techniques to simulate the provision of full duplex communications in the system. Each subscriber (100) in the system communicates with two satellites (102, 104) that use complementary time division duplex (TDD) frame structures (50, 72) for communicating with the subscriber (100). In one embodiment, each satellite in the system performs a transition between a first TDD frame structure (50) and a second TDD frame structure (72) while travelling through a transition region (102) of an associated orbit (130). Preferably, the transition is performed gradually so that an abrupt reduction in system capacity is avoided. In another embodiment, individual orbital planes in the satellite system are dedicated for use with particular TDD frame structures. A subscriber thus communicates with one satellite in each of two planes during a connection.

30 Claims, 4 Drawing Sheets

SYSTEM AND METHOD FOR PROVIDING DUAL SATELLITE COMMUNICATIONS COVERAGE

FIELD OF THE INVENTION

The invention relates generally to satellite communication systems and, more particularly, to systems capable of providing dual satellite coverage.

BACKGROUND OF THE INVENTION

In a satellite communication system, significant advantages can be achieved if the same or a similar frequency band is used to provide both an uplink and a downlink between a satellite and a terrestrial subscriber. For example, such an arrangement allows a single antenna structure to be used on the satellite for both uplinks and downlinks, thus reducing weight and increasing payload space on the satellite. However, use of the same or similar frequency band for both the uplink and the downlink will normally require that some form of time separation be implemented between the transmit and receive activity (e.g., time division duplex (TDD) techniques). This is because a transceiver unit is not generally capable of transmitting and receiving at the same time in the same or similar frequency band because of transmitter leakage into the receive channel that obscures or prevents detection of the receive signal. If the transmit frequency range is different from but near the receive frequency range, then it is possible to use filters to allow simultaneous transmission and reception, but such filter arrangements are complex, costly, and bulky and thus are not generally preferred in satellite applications. Therefore, the transmit activity is generally separated in time from the receive activity. By separating transmit and receive activity in time, however, a significant reduction in system capacity occurs because the available bandwidth is effectively being utilized for only a portion of the available time.

To overcome the reduced capacity problem, at least one satellite communication system has been proposed that is capable of simulating full duplex communication between a terrestrial user and a satellite constellation using a dual satellite coverage approach. A description of such a system can be found in co-pending U.S. patent application Ser. No. 09/094,976, filed on Jun. 15, 1998 which is co-owned with the present application and which is hereby incorporated by reference. In a satellite communication system that provides dual satellite coverage, each subscriber that is communicating with the satellite constellation maintains a communications link with two satellites in the constellation simultaneously. By using two satellites for each subscriber, diversity is obtained which enhances communications reliability and robustness in the system.

To simulate full duplex communications, the system described in the above-referenced patent application utilizes a unique time division duplex (TDD) frame structure within each of the two satellites communicating with a given subscriber. The TDD frame structure used in each of the satellites includes separate transmit and receive time slots for use in communicating with subscribers so that neither satellite transmits and receives in the same frequency band during the same time slot. In addition, the TDD frame structure used in one of the two satellites is the complement of the TDD frame structure used in the other satellite (i.e., the transmit and receive time slots are switched in the two structures). Thus, when one of the satellites is transmitting during a particular time slot, the other satellite is receiving, and vice versa. Because the satellite constellation is both transmitting to and receiving from the subscribers during each time slot, a simulated or "quasi" full duplex arrangement is achieved.

As can be appreciated, to achieve the above-described benefits, a satellite constellation needs to be developed that is capable of providing dual satellite coverage (preferably continuous) over a region of interest. In addition, the constellation should allow each pair of satellites communicating with a common terrestrial subscriber to operate in accordance with the specific complementary TDD frame configuration designed for the system.

DETAILED DESCRIPTION OF A PREFERRED EMBODIMENT

The present invention relates to satellite constellation arrangements that are capable of providing dual satellite coverage within a region of interest. The constellation arrangements each allow a complementary TDD frame configuration to be implemented that enables quasi-full duplex communication to be achieved in communication systems that utilize the same or similar frequency bands in both an uplink and a downlink communications channel. A first constellation arrangement includes a plurality of inclined orbital planes that each include multiple satellites. Northbound satellites in each of the orbital planes utilize a first TDD frame structure for communicating with subscribers while southbound satellites in each of the orbital planes follow a second TDD frame structure that is complementary to the first. Thus, each of the orbital planes includes two transition regions where the individual satellites change between the first and second TDD frame structures. A novel method for performing the transition with minimal impact on system capacity is provided in one aspect of the present invention.

In a second constellation arrangement, referred to herein as the interleaved constellation, multiple orbital planes are provided that alternate between first and second complementary TDD frame structures. That is, each successive orbital plane in the constellation uses a different frame structure from a preceding and subsequent orbital plane. In addition, the TDD frame structure used within a particular orbital plane does not change once it has been assigned. The orbital planes can be either polar or inclined in the interleaved constellation.

In yet another constellation arrangement, an overlay of constellations is used. A first constellation is initially put into operation that includes a first plurality of orbital planes having satellites that utilize a first TDD frame structure. The first constellation is then used to provide half-duplex communication services to a plurality of subscribers. Subsequently, a second constellation is overlaid upon the first constellation. The satellites in the second constellation utilize a second TDD frame structure that is complementary to that used by the satellites in the first constellation. Thus, quasi-full duplex operation is made possible. The second constellation preferably has the same number of orbital planes as the initial constellation and the planes are preferably interleaved with those of the first. The orbital planes in the first and second constellations can be either polar or inclined in orientation.

Figure 1:
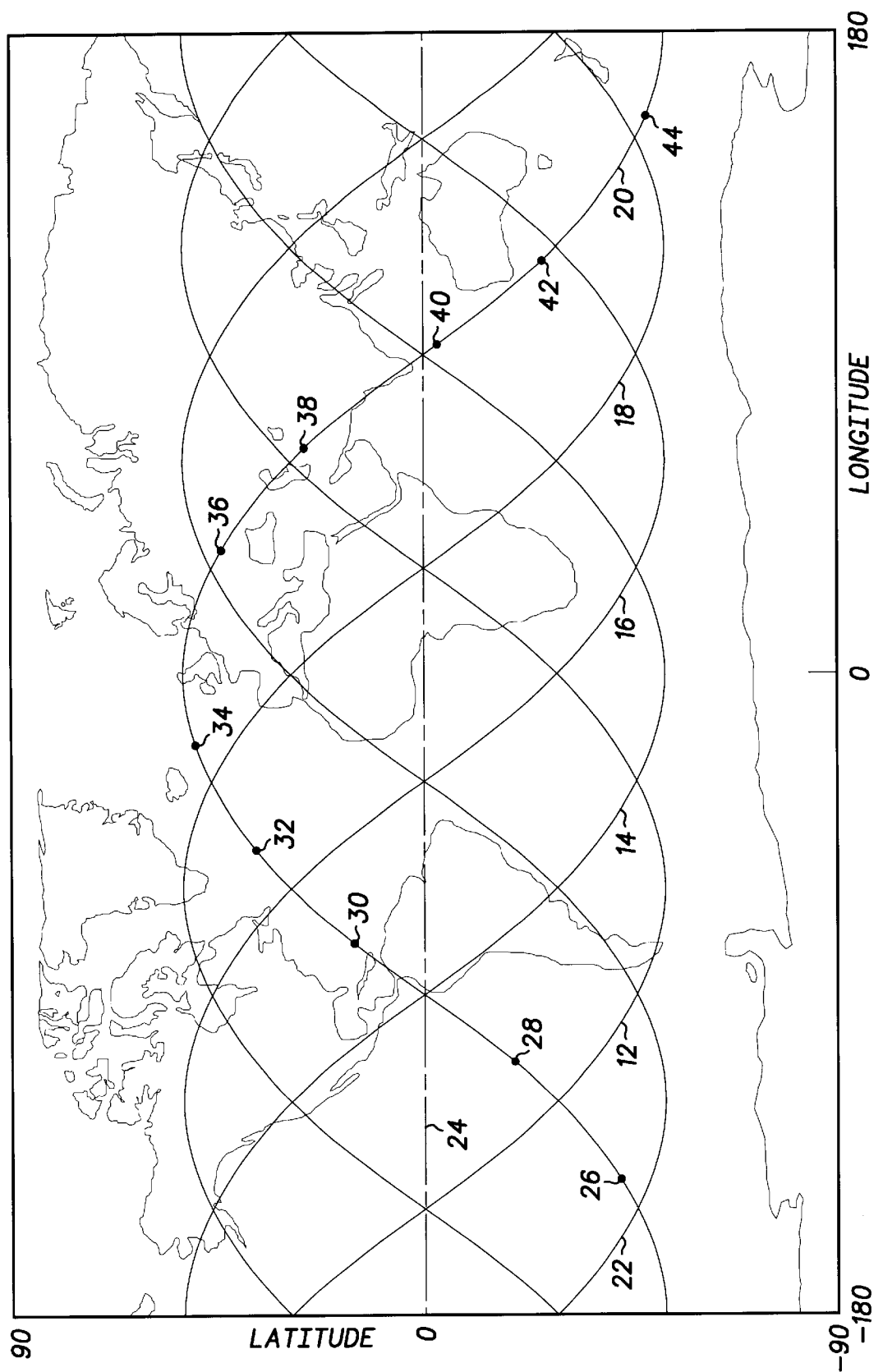
FIG. 1 is a diagram illustrating a satellite constellation that can be used in accordance with the present invention.

FIG. 1 is a diagram illustrating a satellite constellation 10 in accordance with one embodiment of the resent invention. The constellation 10 includes six inclined orbital planes 12, 14, 16, 18, 20, 22, each including 10 satellites (indicated as arrows in the figure). The inclined orbital planes 12, 14, 16, 18, 20, 22 are equally spaced about the circumference of the earth so that the planes cross the equator 24 at equal longitudinal intervals. In general, the satellites within each of the orbital planes are divided into two groups. A first group is comprised of satellites that are traveling in a generally northbound direction and a second group consists of satellites that are traveling in a generally southbound direction. For example, with reference to FIG. 1, orbital plane 20 includes satellites 26, 28, 30, 32, 34, 36, 38, 40, 42, and 44. Satellites 26–34 are northbound satellites and satellites 36–44 are southbound satellites.

In accordance with one embodiment of the invention, the northbound satellites in each orbital plane utilize a first TDD frame structure while the southbound satellites in the orbital plane utilize a second TDD frame structure that is complementary to the first. That is, the first frame structure includes a plurality of time slots that are each either a transmit time slot or a receive time slot and the second frame structure includes an equal number of time slots hat each have a type that is opposite to that of a corresponding time slot in the first frame structure (i.e., transmit time slots in the first frame structure correspond to receive time slots in the second frame structure and vide versa). Thus, northbound satellites in the system will be transmitting to subscribers when southbound satellites are receiving and southbound satellites in the system will be transmitting when northbound satellites are receiving.

In most cases, a subscriber using the satellite system will be linked to two satellites during the communication. One of the two satellites will be a northbound satellite and the other will be a southbound satellite. In some cases, however, only a single satellite will be visible to a subscriber, in which case only one satellite link will be maintained during communication. In a preferred approach, the satellites used for a particular subscriber will be the highest elevation northbound satellite and the highest elevation southbound satellite that is visible from the subscriber position.

Figure 2:
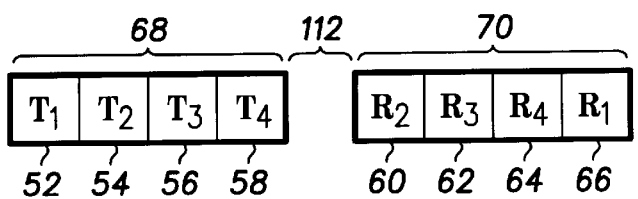
FIGS. 2 and 3 are diagrams illustrating time division duplex (TDD) frame structures that can be utilized in accordance with the present invention.
Figure 3:
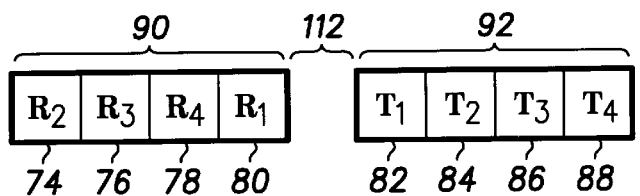

As described above, the two satellites associated with a particular subscriber (which will be referred to herein as the TDD pair) will use complementary TDD frame structures to achieve quasi-full duplex communications between the subscriber and the constellation. FIGS. 2 and 3 illustrate complementary TDD frame structures 50, 72 that can be used in the northbound and southbound satellites, respectively, of a TDD pair during a given connection. In the illustrated embodiment, both of the TDD frame structures 50, 72 include eight time slots that are each used as either a transmit time slot or a receive time slot. During a transmit time slot, a corresponding satellite can transmit to a remote subscriber but cannot receive from a subscriber. Similarly, during a receive time slot, a satellite can receive from a remote subscriber but cannot transmit to a subscriber.

As illustrated in FIG. 2, TDD frame structure 50 is divided into two sub-frames 68, 70, the first of which (i.e., sub-frame 68) includes four transmit time slots 52, 54, 56, 58 and the second of which (i.e., sub-frame 70) includes four receive time-slots 60, 62, 64, 66. Conversely, as illustrated in FIG. 3, TDD frame structure 72 is divided into two sub-frames 90, 92, the first of which (i.e., sub-frame 90) includes four receive time slots 74, 76, 78, 80 and the second of which (i.e., sub-frame 92) includes four transmit time-slots 82, 84, 86, 88. In general, each of the time slots in a sub-frame represents an independent communication channel and will thus correspond to a different subscriber than the other time-slots in the sub-frame.

Figure 4:
FIG. 4 is a diagram illustrating communication between a subscriber and a pair of satellites in accordance with the present invention.
Figure 4:
Figure 4:
Figure 4:
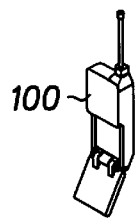
Figure 4:
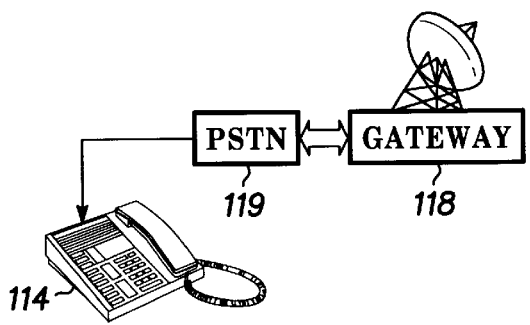

FIG. 4 is a diagram illustrating a terrestrial subscriber 100 communicating with two satellites 102, 104 forming a TDD pair in accordance with one embodiment of the present invention. During communication, the terrestrial subscriber 100 maintains a two way wireless link 106 with each of the two satellites 102, 104. Satellite 102 is a northbound satellite and thus communicates with the terrestrial subscriber 100 using a northbound TDD frame structure (e.g., TDD frame structure 50 of FIG. 2). Conversely, satellite 104 is a southbound satellite and thus communicates with the terrestrial subscriber 100 using a southbound TDD frame structure (e.g., TDD frame structure 72 of FIG. 3).

In addition, satellite 102 and satellite 104 are able to communicate with one another via one or more cross links 110 in the system. Using the cross links 110 and on board timing structures, an accurate timing standard is maintained in the system so that satellites within each TDD pair are synchronized with one another and are thus capable of operating in accordance with the corresponding frame structures. Thus, when satellite 102 is transmitting during first time slot 52 of TDD frame structure 50, satellite 104 will be receiving during first time slot 74 of TDD frame structure 72, and so on. In practice, perfect synchronization will be difficult to maintain and therefore guard bands 112 are used within the frame structures 50, 72 to compensate for timing errors. In one embodiment, global positioning system (GPS) links are maintained for providing accurate time information.

As discussed above, each of the time slots within a particular sub-frame of a TDD frame structure (e.g., first sub-frame 90 of TDD frame structure 72) will correspond to a different terrestrial subscriber than the other time slots in the same sub-frame. Preferably, the time slots in the other sub-frame in the TDD frame structure (e.g., second sub-frame 92 of TDD frame structure 72) will correspond to the same group of subscribers as the first sub-frame. However, the time order of the subscribers in the second sub-frame does not have to correspond to the time order of subscribers in the first sub-frame.

In general, a first satellite in a TDD pair (e.g., satellite 102 of FIG. 4) will not transmit to a particular subscriber (e.g., terrestrial subscriber 100) during a period of time when the second satellite in the TDD pair (e.g., satellite 104) is receiving from that subscriber. If this were permitted, a situation might exist where a receive channel within a transceiver unit associated with the subscriber 100 is overloaded by leakage signals from a corresponding transmit channel. Thus, the receive time slot corresponding to a particular subscriber in one of the TDD frame structures 50, 72 will normally be located in a different temporal position within the frame structure than a transmit time slot corresponding to the same subscriber in the other TDD frame structure. FIGS. 2 and 3 illustrate one method for achieving this. In the figures, subscripts are used within the time slots to indicate communications activity corresponding to particular subscribers (i.e., each subscript numeral identifies a specific subscriber). As illustrated, corresponding time slots in the two TDD structures 50, 72 never involve the same subscriber. For example, during a first time slot 52,74, satellite 102 transmits to a first subscriber while satellite 104 receives from a second subscriber. During a second time slot 54, 76, satellite 102 transmits to the second subscriber while satellite 104 receives from a third subscriber, and so on.

With reference to FIG. 4, during a typical communication connection, the terrestrial subscriber 100 will be communicating with a remote terrestrial entity 114 through the satellite system. In the illustrated embodiment, the remote entity 114 communicates with a satellite 116 in the constellation through a public switched telephone network (PSTN) 119 and a satellite gateway 118 that is linked to the satellite 116 via a two way satellite link 117. The satellite 116, in turn, communicates with satellite 102 and satellite 104 via one or more intervening crosslinks 110. During transmissions from the terrestrial subscriber 100 to the remote terrestrial entity 114, packets of information uplinked to satellite 102 and satellite 104 by the terrestrial subscriber 100 are reassembled into a usable form either within the satellites themselves or within the satellite gateway 118. The reassembled information is then delivered to the remote entity 114 via the PSTN 119. Similarly, packets downlinked from the satellites 102, 104 to the terrestrial subscriber 100 are reassembled within the associated subscriber unit. Although the terrestrial subscriber 100 does not simultaneously transmit and receive to/from the satellites 102, 104 as would be required for actual full-duplex communication, the system, as a whole, achieves what is referred to herein as "quasi-full duplex communication" because uplink and downlink transmissions are occurring between the satellites 102, 104 and the subscribers within each available time slot. Therefore, the system can achieve near optimal capacity while utilizing the same frequency band for both the uplink and the downlink.

It should be appreciated that the TDD frame structures 50, 72 of FIGS. 2 and 3 may be part of a larger multiple access scheme involving other multiple access techniques. For example, frequency division multiple access (FDMA) can be used to segment a larger bandwidth into a plurality of sub-bands, here each sub-band implements a complementary TDD frame arrangement as described above. Alternatively, or in addition, code division multiple access (CDMA) techniques can be used to provide multiple channels within each of the time slots of the TDD structures 50, 72. Other multiple access arrangements will also be apparent to persons of ordinary skill in the art.

As described above, in one embodiment, satellites within the constellation 10 utilize a first TDD frame structure when they are northbound in their orbits and a second TDD frame structure that is complementary to the first when they are southbound in their orbits. Therefore, each satellite is repeatedly transitioning between the two complementary TDD frame structures (i.e., repeatedly changing phase) while it revolves about the earth. One such transition will normally occur near a northernmost portion of an orbit while another will occur near a southernmost portion of the orbit. In one approach, a phase change is accomplished within a satellite by first terminating all northbound (or southbound) subscriber links of the satellite and subsequently activating a group of southbound (or northbound) subscriber links in the satellite. While effective, this approach causes a significant reduction in system capacity due to its abrupt termination of all northbound links. Typically, for example, implementation of such an approach will require maintenance of triple satellite coverage for each of the subscribers in the transition region so that loss of the corresponding northbound links will not cause a reduction in communications quality in these regions.

Figure 5:
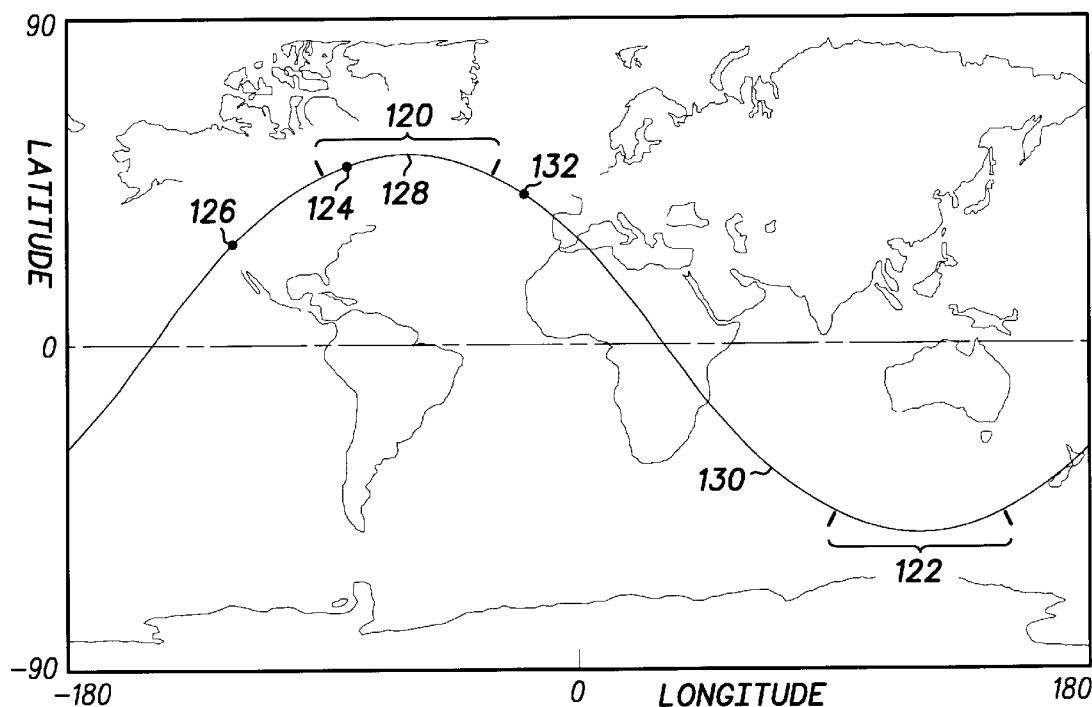
FIG. 5 is a diagram illustrating a transition region within an inclined orbital plane that can be used to transition between two TDD frame structures in accordance with the present invention.

In one aspect of the present invention, a method is provided for transitioning between TDD phases that gradually reduces the number of northbound (or southbound) links through a transition region so that an abrupt loss of system capacity is not experienced. Similarly, the method gradually increases the number of southbound (or northbound) links during the transition. FIG. 5 is a diagram of an orbital plane 130 that can be, for example, one of the orbital planes in the constellation 10 of FIG. 1. As illustrated in FIG. 5, a relatively large transition region 120 is defined at a northernmost extent of the orbital plane 130. Another transition region 122 is defined at a southernmost extent of the orbital plane 130. After a satellite 124 has entered the transition region 120, it no longer accepts handoffs as a northbound satellite but, instead, begins to accept handoffs as a southbound satellite, even though a northernmost point 128 in the orbital plane 130 has not yet been reached. The satellite 124 gradually converts time slots in its TDD frame from a northbound arrangement to a southbound arrangement by, for example, gradationally handing off northbound links to other northbound satellites (e.g., satellite 126) as the satellite 124 progresses through the transition region 120. The satellite 124 also begins to gradually accept handoffs from southbound satellites (e.g., satellite 132) to fill the time slots left vacant by the abandoned northbound links. Eventually, the entire TDD frame has been converted from a northbound structure to a southbound structure (or vice versa for the southern transition region 122).

Figure 6:
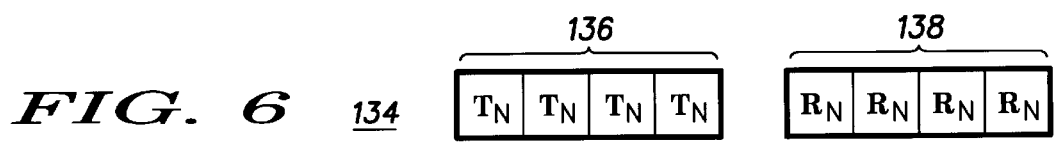
FIGS. 6–12 are a series of TDD frame diagrams illustrating changes in a TDD frame structure as a satellite passes through a transition region of an associated orbital plane.
Figure 7:
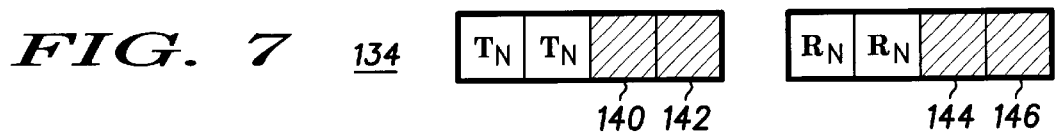

FIGS. 6–12 are a series of frame diagrams illustrating structural changes that occur in the TDD frame 134 of the satellite 124 as the satellite 124 travels through the transition region 120 in one embodiment of the present invention. With reference to FIGS. 5 and 6, as the satellite 124 enters the transition region 120, the TDD frame 134 has a fully northbound structure. That is, a first sub-frame 136 includes all northbound transmit time slots and a second sub-frame 138 includes all northbound receive time slots. As the satellite 124 progresses within the transition region 120, as shown in FIG. 7, two of the northbound transmit time slots 140, 142 and two of the northbound receive time slots 144, 146 are deactivated (indicated in FIG. 7 by shading). The time slots chosen for deactivation will generally correspond to a reduction in the coverage area of the satellite 124 as it travels through the transition region 120. Thus, subscribers outside of the reduced coverage area of the satellite 124 will either be handed off to another northbound satellite or reduced to single satellite coverage (i.e., reduced to coverage by only a southbound satellite). In a preferred approach, a subscriber will only be reduced to single satellite coverage if there are no northbound satellites in view that have available links.

Figure 8:
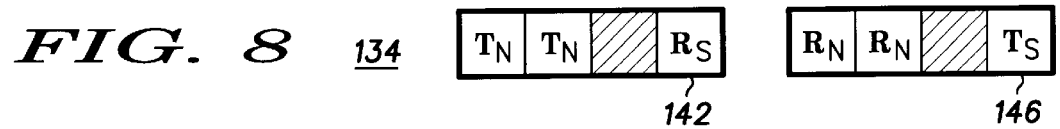

As illustrated in FIG. 8, after time slots 140, 142, 144, and 146 have been deactivated, some of the time slots (i.e., time slots 142 and 146) are reactivated as southbound time slots. That is, time slot 142 is reactivated as a southbound receive time slot and time slot 146 is reactivated as a southbound transmit time slot. These time slots are now available to accept handoffs from a southbound satellite (e.g., satellite 132). In limited circumstances, a subscriber will be located in an area (e.g., certain high latitude locations) where only a single satellite link to the transitioning satellite 124 is possible. If this subscriber is currently linked to the satellite 124 in a northbound TDD arrangement, the satellite 124 will instruct the subscriber's transceiver unit to change from a northbound TDD structure to a southbound TDD structure. The satellite 124 will then allocate one of the new southbound receive time slots and one of the new southbound transmit time slots to the subscriber so that communication with the subscriber is maintained. Preferably, the transition will be transparent to the subscriber with little or no interruption in service.

Figure 9:
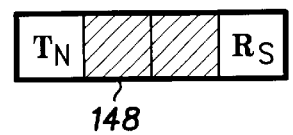
Figure 9:
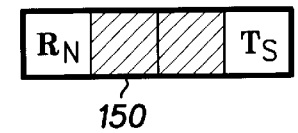
Figure 10:
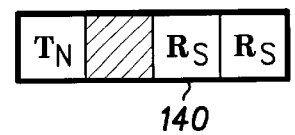
Figure 10:
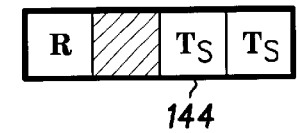
Figure 11:
Figure 11:
Figure 12:
Figure 12:
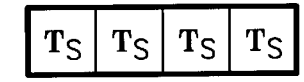

With reference to FIGS. 9 and 10, as the satellite 124 continues through the transition region 120, additional northbound time-slots (e.g., time slots 148 and 150) will be deactivated and additional deactivated time slots (e.g., time slots 140 and 144) will be reactivated as southbound time slots. As shown in FIGS. 11 and 12, this procedure is continued until all of the northbound time slots have been converted to southbound time slots. Because the conversion is performed in a gradational manner, the impact on system capacity is reduced and the need for full triple satellite coverage in the transition region is avoided.

In another embodiment of the present invention, an "interleaved" constellation arrangement is used that does not require a TDD phase change within each orbital plane. Instead, each successive orbital plane in the constellation uses a different (and complementary) TDD frame structure from a preceding and subsequent orbital plane in the constellation. Thus, the two complimentary TDD frame structures are interleaved on a plane by plane basis. This constellation arrangement can use either polar or inclined orbital planes. For example, the constellation 10 of FIG. 1 can be used in an interleaved constellation arrangement by assigning one TDD frame structure (e.g., frame structure 50 illustrated in FIG. 2) to satellites in orbital planes 12, 16, and 20 and a complementary TDD frame structure (e.g., frame structure 72 illustrated in FIG. 3) to satellites in orbital planes 14, 18, and 22. Once a frame structure has been assigned to satellites in an orbital plane, the frame structure does not thereafter change. To achieve quasi-full duplex communication in such a system, each subscriber must maintain a link one satellite in each of two orbital planes using complementary TDD frame structures.

In another embodiment of the invention, an overlay constellation arrangement is used where a second constellation using a second TDD frame structure is overlaid upon a first constellation using a first TDD frame structure, where the first and second TDD frame structures are complementary. In a preferred approach, the first constellation is initially put into operation and used to provide communication services to a plurality of subscribers using a half duplex arrangement. Subsequently, the second constellation is overlaid upon the first, thus enabling quasi-full duplex communication to be achieved.

The first and second constellations of the overlay arrangement can utilize either polar or inclined orbital lanes. For example, with reference to the constellation 10 of FIG. 1, orbital planes 12, 16, and 20 can be populated initially to provide single satellite, half-duplex coverage across the surface of the earth. Subsequently, orbital planes 14, 18, and 22 can be overlaid upon the initial constellation to provide a complementary TDD frame structure and thus enable dual satellite, quasi-full duplex communications coverage in the system. By building the overall system in stages, a reduced amount of time is required before substantial global coverage is achieved and costs associated with the overlay constellation can be deferred to a period of time when income is being produced by the initial constellation.

In a preferred approach, the overlay constellation uses the same number and type of orbital planes as the initial constellation. Therefore, if a three plane, inclined orbit constellation is initially used, the overlay would be a three plane, inclined orbit constellation. In addition, the overlay constellation will preferably be interleaved with the initial constellation and thus form an interleaved constellation arrangement when completed. The overlay constellation, however, is not limited to being a duplicate of the initial constellation. In fact, any constellation configuration can be used as an overlay constellation as long as the required crosslinks are available between satellites constituting each TDD pair.

Although the present invention has been described in conjunction with its preferred embodiments, it is to be understood that modifications and variations may be resorted to without departing from the spirit and scope of the invention as those skilled in the art readily understand. For example, the number of orbital planes in a constellation and the number of satellites within an orbital plane in any particular implementation are generally a matter of design choice and are thus not meant to be limiting. Similarly, the TDD frame structures of the present invention can include virtually any combination and/or orientation of transmit time frames and receive time frames and are not limited to the specific arrangements disclosed herein. Such modifications and variations are considered to be within the purview and scope of the invention and the appended claims.

What is claimed is:

1. In a communication satellite that uses time division duplex (TDD) techniques to communicate with remote subscribers, a method for transitioning between a first TDD frame structure and a second TDD frame structure, said first TDD frame structure including a predetermined number of time slots that are each either a transmit type time slot or a receive type time slot, said second TDD frame structure being synchronous with said first TDD frame structure and including an equal number of time slots to said first TDD frame structure, said time slots in said second TDD frame structure each being either a transmit type time slot or a receive type time slot, wherein transmit type time slots in said first TDD frame structure correspond in time to receive type time slots in said second TDD frame structure and receive type time slots in said first TDD frame structure correspond in time to transmit type time slots in said second TDD frame structure, said method comprising the steps of:

providing a first satellite orbiting a primary body in an inclined orbital plane, said first satellite communicating with a plurality of subscribers using a plurality of time slots that follow the first TDD frame structure;

determining that said first satellite has entered a transition region in said inclined orbital plane;

deactivating, after said step of determining, a subset of time slots in said plurality of time slots so that no communication is performed during said subset of time slots;

activating at least one deactivated time slot as a time slot type that is opposite to a time slot type associated with said at least one deactivated time slot previous to said deactivating step; and repeating said steps of deactivating and activating until said plurality of time slots follow the second TDD frame structure.

2. The method claimed in claim 1, further comprising the step of:

handing off a first communication link with a first subscriber from said first satellite to a second satellite no later than said step of deactivating, wherein a first time slot associated with said first communication link is deactivated during said step of deactivating.

3. The method claimed in claim 2, wherein:
said step of handing off includes handing off said first communication link to another satellite in said inclined orbital plane.

4. The method claimed in claim 1, wherein:
said first satellite changes from a northbound satellite to a southbound satellite within said transition region of said inclined orbital plane.

5. The method claimed in claim 1, wherein:
said first TDD frame structure includes a first sub-frame having N time slots and a second sub-frame having M time slots, wherein N and M are integers, wherein said first sub-frame consists of time slots having a first time slot type and said second sub-frame consists of time slots having a second time slot type.

6. The method claimed in claim 5, wherein:
said first time slot type includes transmit type time slots and said second time slot type includes receive type time slots.

7. The method claimed in claim 5, wherein:
said first sub-frame and said second sub-frame collectively include all time slots in said first TDD frame structure.

8. The method claimed in claim 5, wherein N is equal to M.

9. A method for managing communications in a satellite communication system, comprising the steps of:
providing a first satellite orbiting about a primary body within an inclined orbital plane;
communicating with a plurality of subscribers from said first satellite according to a time division duplex (TDD) frame structure, said TDD frame structure including a plurality of transmit time frames and a plurality of receive time frames, wherein said first satellite transmits a signal to a subscriber during a transmit time frame in said TDD frame structure and receives a signal from a subscriber during a receive time frame in said TDD frame structure; and
gradually converting transmit time slots in said TDD frame structure to receive time slots and receive time slots in said TDD frame structure to transmit time slots as said first satellite travels through a predetermined transition region in said inclined orbital plane.

10. The method claimed in claim 9, wherein:
said predetermined transition region spans a northernmost point in said inclined orbital plane.

11. The method claimed in claim 9, wherein:
said inclined orbital plane includes two predetermined transition regions.

12. The method claimed in claim 9, wherein:
said step of communicating includes transmitting a signal to a different subscriber during each of said plurality of transmit time frames.

13. The method claimed in claim 9, wherein:
said step of communicating includes receiving a signal from a different subscriber during each of said plurality of receive time frames.

14. The method claimed in claim 9, wherein:
said step of gradually converting includes handing off a first subscriber link to another satellite.

15. The method claimed in claim 14, wherein:
said step of gradually converting includes changing a first time slot that was used by said first subscriber link before said step of handing off to an opposite time slot type.

16. The method claimed in claim 15, wherein:
said step of gradually converting includes receiving a handoff of a second subscriber link from another satellite.

17. The method claimed in claim 16, wherein:
said step of gradually converting includes assigning said second subscriber link to said first time slot.

18. The method claimed in claim 9, wherein:
said step of gradually converting includes converting some time slots in said TDD frame structure during a first time interval, other time slots in said TDD frame structure during a second time interval that is different from said first time interval, and still other time slots in said TDD frame structure during a third time interval that is different from said first and second time intervals as said satellite travels through said predetermined transition region in said inclined orbital plane.

19. A satellite communication system comprising:
a plurality of inclined orbital planes each having a plurality of communication satellites distributed therein, wherein northbound satellites in each of said plurality of inclined orbital planes follow a first TDD frame structure to communicate with subscribers and southbound satellites in each of said plurality of inclined orbital planes follow a second TDD frame structure to communicate with subscribers, wherein said first and second TDD frame structures each include a plurality of time slots having a first group of receive type time slots and a second group of transmit type time slots, wherein said first group of said first TDD frame structure corresponds in time to said second group of said second TDD frame structure and said second group of said first TDD frame structure corresponds in time to said first group of said second TDD frame structure;
a first subscriber simultaneously coupled to a first northbound satellite and a first southbound satellite in said plurality of inclined orbital planes, said first subscriber communicating with said first northbound satellite in accordance with said first TDD frame structure and said first subscriber communicating with said first southbound satellite in accordance with said second TDD frame structure; and
wherein at least one satellite in said plurality of inclined orbital planes includes means for gradually transitioning from said first TDD frame structure to said second TDD frame structure as said at least one satellite travels through a transition region at a northernmost portion of a corresponding inclined orbital plane.

20. The system claimed in claim 19, wherein:
said means for gradually transitioning includes means for reducing a coverage area of said at least one satellite after said at least one satellite has entered said transition region.

21. The system claimed in claim 19, wherein:
said means for gradually transitioning includes means for handing off a first subset of subscriber links associated with said first TDD frame structure to another satellite at a first instant in time.

22. The system claimed in claim 21, wherein:
said means for gradually transitioning includes means for handing off a second subset of subscriber links associated with said first TDD frame structure to another satellite at a second instant in time, wherein said second instant in time occurs after said first instant in time.

23. The system claimed in claim 19, wherein:

multiple satellites in said plurality of inclined orbital planes include means for gradually transitioning from said first TDD frame structure to said second TDD frame structure as each of said multiple satellites travels through a transition region at a northernmost portion of a corresponding inclined orbital plane.

24. The system claimed in claim 19, wherein:

said first northbound satellite and said first southbound satellite maintain a common clock so that said first TDD frame structure and said second TDD frame structure are synchronized with one another.

25. A satellite communication system comprising:

a first orbital plane comprising a first plurality of satellites orbiting about a primary body, each of said first plurality of satellites including means for communicating with at least one remote subscriber according to a first time division duplex (TDD) frame arrangement, said first TDD frame arrangement including a first plurality of transmit time slots and a first plurality of receive time slots, each of said first plurality of transmit time slots for use in transmitting a signal from an associated satellite to a remote subscriber and each of said first plurality of receive time slots for use in receiving a signal from a remote subscriber at the associated satellite;

a second orbital plane comprising a second plurality of satellites orbiting about the primary body, each of said second plurality of satellites including means for communicating with at least one remote subscriber according to a second TDD frame arrangement, said second TDD frame arrangement including a second plurality of transmit time slots and a second plurality of receive time slots, each of said second plurality of transmit time slots for use in transmitting a signal from a corresponding satellite to a remote subscriber and each of said second plurality of receive time slots for use in receiving a signal from a remote subscriber at the corresponding satellite, wherein said second plurality of receive time slots corresponds in time to said first plurality of transmit time slots and said second plurality of transmit time slots corresponds in time to said first plurality of receive time slots; and a first subscriber simultaneously coupled to a first satellite in said first orbital plane and a second satellite in said second orbital plane, said first subscriber communicating with said first satellite in accordance with said first TDD frame arrangement and said first subscriber communicating with said second satellite in accordance with said second TDD frame arrangement.

26. The system claimed in claim 25, wherein:

said first satellite and said second satellite communicate with one another via at least one satellite crosslink.

27. The system claimed in claim 25, wherein:

said first satellite and said second satellite maintain a common clock so that said first and second TDD frame arrangements are synchronized with one another.

28. The system claimed in claim 25, wherein:

said first and second orbital planes are inclined orbital planes.

29. The system claimed in claim 25, wherein:

said first and second orbital planes are polar orbital planes.

30. The system claimed in claim 25, further comprising:

a plurality of additional orbital planes, wherein each successive orbital plane in the satellite communication system uses a different TDD frame structure than a previous orbital plane in the satellite communication system.

* * * * *